United States Patent
Steeves

(10) Patent No.: US 9,213,992 B2
(45) Date of Patent: Dec. 15, 2015

(54) SECURE ONLINE TRANSACTIONS USING A TRUSTED DIGITAL IDENTITY

(75) Inventor: David J. Steeves, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1824 days.

(21) Appl. No.: 11/177,231

(22) Filed: Jul. 8, 2005

(65) Prior Publication Data
US 2007/0011066 A1    Jan. 11, 2007

(51) Int. Cl.
*G06Q 20/00* (2012.01)
*G06Q 40/02* (2012.01)
*G06Q 40/00* (2012.01)

(52) U.S. Cl.
CPC ............. *G06Q 40/02* (2013.01); *G06Q 40/00* (2013.01)

(58) Field of Classification Search
USPC ............ 705/64, 16, 21, 59; 380/44, 262, 278, 380/279
See application file for complete search history.

(56) References Cited

U.S. PATENT DOCUMENTS

| | | | |
|---|---|---|---|
| 5,715,314 A | 2/1998 | Payne et al. | |
| 6,012,039 A | 1/2000 | Hoffman et al. | |
| 6,195,698 B1 | 2/2001 | Lillibridge et al. | |
| 6,226,752 B1 | 5/2001 | Gupta et al. | |
| 6,678,821 B1 | 1/2004 | Waugh et al. | |
| 6,760,841 B1 * | 7/2004 | Fernandez | 713/172 |
| 7,006,661 B2 | 2/2006 | Miller et al. | |
| 7,080,037 B2 | 7/2006 | Burger et al. | |
| 7,610,216 B1 | 10/2009 | May et al. | |
| 2001/0000265 A1 | 4/2001 | Schreiber et al. | |
| 2002/0010515 A1 | 1/2002 | Fukuoka et al. | |
| 2002/0044650 A1 * | 4/2002 | Shen | 380/30 |
| 2002/0059146 A1 * | 5/2002 | Keech | 705/64 |
| 2002/0065065 A1 | 5/2002 | Lunsford et al. | |
| 2002/0095389 A1 | 7/2002 | Gaines | |
| 2002/0099663 A1 * | 7/2002 | Yoshino et al. | 705/65 |
| 2002/0107791 A1 | 8/2002 | Nobrega et al. | |
| 2003/0005464 A1 | 1/2003 | Gropper et al. | |
| 2003/0110400 A1 | 6/2003 | Cartmell et al. | |
| 2003/0115142 A1 | 6/2003 | Brickell et al. | |
| 2003/0172283 A1 | 9/2003 | O'Hara | |
| 2003/0204725 A1 * | 10/2003 | Itoi et al. | 713/168 |
| 2004/0049515 A1 * | 3/2004 | Haff et al. | 707/100 |
| 2004/0069853 A1 * | 4/2004 | Aharonson | 235/454 |
| 2004/0165728 A1 | 8/2004 | Crane et al. | |

(Continued)

FOREIGN PATENT DOCUMENTS

JP    411085548    3/1999

OTHER PUBLICATIONS

U.S. Appl. No. 11/254,497, filed Oct. 20, 2005, Steeves.

(Continued)

*Primary Examiner* — Dante Ravetti
(74) *Attorney, Agent, or Firm* — Timothy Churna; Judy Yee; Micky Minhas

(57) ABSTRACT

Techniques for conducting secure online transactions are provided. Some techniques utilize a trusted, secure device that is distributed to a human user, and which only the user can access, a device reader, and a one-time secret valid only to authenticate a single transaction to improve on the traditional transaction model by isolating elements of the transaction with the user on the user's trusted, secure device. Isolating elements of the transaction on the trusted, secure device facilitates a secure transaction on an untrusted machine and over an untrusted network.

21 Claims, 7 Drawing Sheets

(56) References Cited

U.S. PATENT DOCUMENTS

| | | |
|---|---|---|
| 2004/0199763 A1 | 10/2004 | Freund |
| 2004/0225600 A1* | 11/2004 | Onodera et al. ............... 705/38 |
| 2004/0266533 A1* | 12/2004 | Gentles et al. ................. 463/42 |
| 2005/0021480 A1* | 1/2005 | Haff et al. ...................... 705/75 |
| 2005/0065802 A1 | 3/2005 | Rui et al. |
| 2005/0165612 A1* | 7/2005 | Van Rysselberghe ........... 705/1 |
| 2005/0203843 A1* | 9/2005 | Wood et al. .................... 705/40 |
| 2005/0246193 A1 | 11/2005 | Roever et al. |
| 2006/0047766 A1 | 3/2006 | Spadea |
| 2006/0229998 A1 | 10/2006 | Harrison et al. |
| 2006/0287907 A1 | 12/2006 | Kim |
| 2007/0005500 A1 | 1/2007 | Steeves et al. |
| 2007/0028109 A1 | 2/2007 | Wysocki et al. |
| 2009/0249477 A1 | 10/2009 | Punera |
| 2012/0174215 A1 | 7/2012 | Steeves |

OTHER PUBLICATIONS

U.S. Appl. No. 11/264,369, filed Nov. 1, 2005, Ellison.
U.S. Appl. No. 11/303,441, filed Dec. 15, 2005, Steeves.
U.S. Appl. No. 11/157,336, filed Jun. 20, 2005, Steeves et al.

* cited by examiner

SECURE ONLINE TRANSACTIONS USING A TRUSTED DIGITAL IDENTITY

BACKGROUND

The proliferation of computers and the maturing of the World Wide Web ("web") have resulted in the web increasingly becoming a medium used to conduct online commerce. Indeed, a broad range of commercial and financial transactions may be conducted over the web.

For example, increasing numbers of web merchants provide websites that a user (e.g., consumer) who plans to purchase a product can access (i.e., visit) to view information about the product, select the product for purchase, place an order for the product, and provide information, such as payment and shipping information, needed to complete the purchase all electronically online over the web. The user typically provides an account number (e.g., credit card account number, debit card account number, checking account number, etc.) as part of the payment information.

Like the web merchants, increasing numbers of financial institutions are also providing their customers online services over the web. For example, many banks now provide their customers the ability to perform numerous online transactions, such as online banking, online funds transfer, online bill payment, online trading, etc., over the web. In a typical online banking transaction, the user provides identification information, such as an account number and password, to gain remote access to the user's account. The user then requests one or more online transactions that involve the accessed account.

The increase in the level of online transactions has also brought about an increase in the levels of identity theft, account takeover, and online fraud. The common threat to online transactions is the use of usernames and passwords. The use and transmission of sensitive information (i.e., usernames, account numbers, passwords, etc.) over the web, Internet, or other unsecured networks, has increased the threat that this information may be intercepted or stolen at the user's computing system, while in transit from the user's computing system to the online merchant's website, or at the merchant's website or server computing system.

One threat is a phishing attack. In a phishing attack, a user is tricked into providing the user's sensitive information (e.g., account numbers, login identification, passwords, PINs, etc.) to a malicious user, typically referred to as a "phisher." For example, in online banking, a phisher would try to trick a user into providing the user's account number and password. Once the phisher has the user's account number and password, the phisher can online bank as the user.

Another threat is a "man in the middle" attack. A man in the middle attack occurs when a "hacker" gets between a user's computing system (e.g., client or client computing system) and the merchant's website. For example, using social engineering, the hacker may trick the user into thinking that the hacker is the user's-bank, for example, through a hyperlink in an email message (e.g., an email message that appears to be sent by a reliable source, such as the users bank) or other hyperlinks. If the website addressed by the hyperlink appears identical or very similar to the user's bank's website, the user is likely to login, and, at this point, the hacker will have the information needed to perform online fraud.

Still another threat is the possibility of the user's computing system becoming fully compromised. For example, a remote shell to the hacker or a "trojan" listening for the user to access the user's bank's website may be installed and executing on an unsuspecting user's computing system.

SUMMARY

A technique for conducting secure online transactions utilizes a trusted, secure device that is distributed to a human user, and which only the user can access, a device reader, and a one-time secret valid only to authenticate a single transaction to improve on the traditional transaction model by isolating elements of the transaction with the user on the user's trusted, secure device. Isolating elements of the transaction on the trusted, secure device facilitates a secure transaction on an untrusted machine and over an untrusted network.

The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
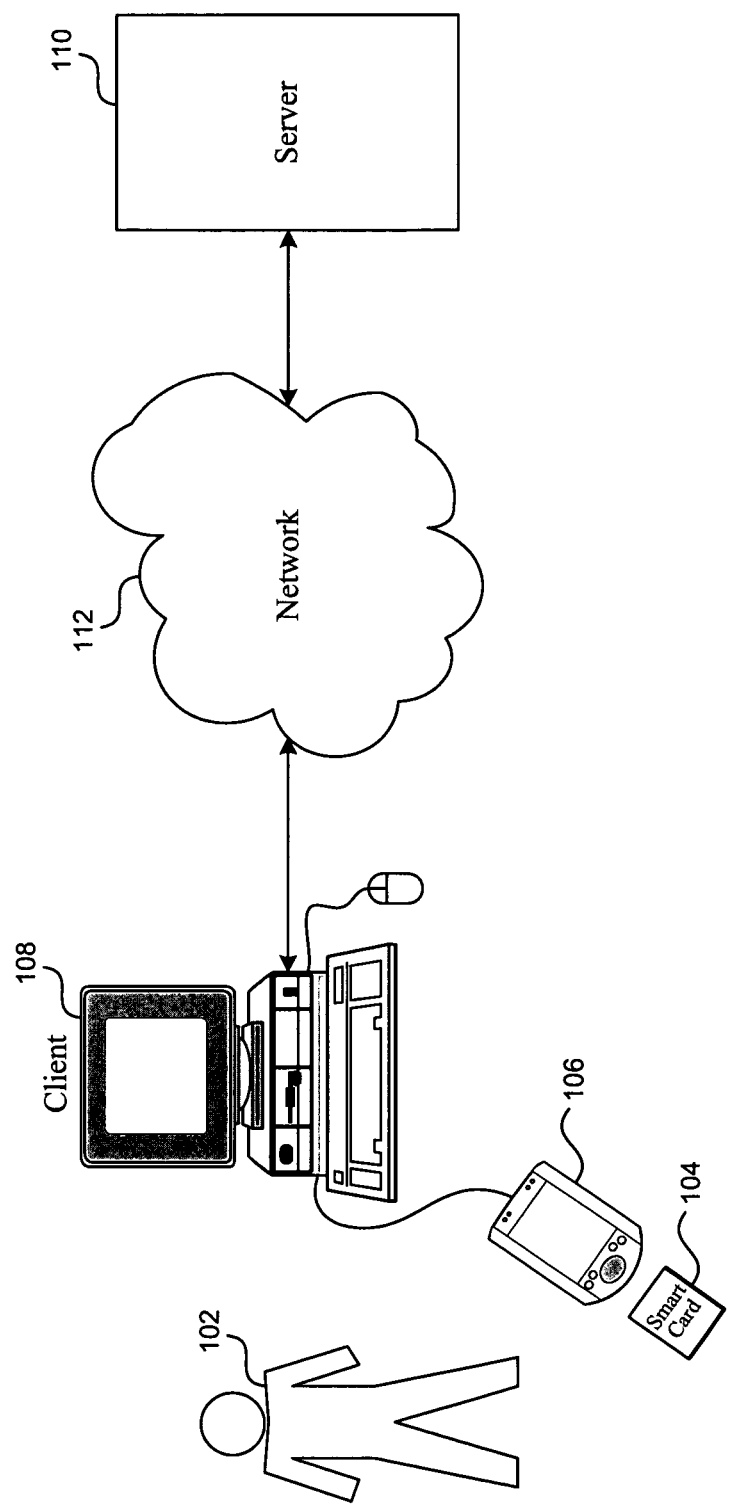
FIG. 1 is a high-level block diagram showing an environment in which the secure online transactions may operate.

Various techniques for conducting secure online transactions are described. In some embodiments, the techniques utilize a trusted, secure device that is distributed to a human being (referred to herein as a "user"), and which only the user can access, and a one-time secret valid only to authenticate a single transaction to improve on the traditional transaction model by isolating elements of the transaction with the user on the user's trusted, secure device. Isolating elements of the transaction on the trusted, secure device facilitates a secure transaction on an untrusted machine and over an untrusted network.

In a traditional transaction model, a user uses a client machine, such as a personal computer, to access and conduct transactions on a transaction server, such as a web server provided by a merchant. In order to conduct transactions on the server, the user typically logs onto the server by providing valid identification information, such as login identification and password. In response, the server authenticates the user as an authorized user, and provides the user access to the server. Upon gaining access, the user uses his or her client machine and requests a transaction to be performed on the server. In response, the server requests that the user verify the transaction by displaying details of the transaction on the user's client machine. The user then views—e.g., looks at—the displayed transaction, and uses his or her client machine to either accept the transaction or deny the displayed transaction. In response to the user accepting the transaction, the server performs the transaction and displays a receipt on the user's client machine.

In some embodiments, a user uses an authenticating device, such as, by way of example, a smart card, secure token, biometric device, etc., and an authenticating device reader to securely conduct transactions with a transaction provider, such as, by way of example, a merchant, a service provider, a financial institution, an entity (e.g., company, corporation, etc.), a computing system or network appliance/machine, network, etc. The user may obtain the authenticating device or physical key from the transaction provider or an authorized third party. The authenticating device typically includes a cryptographic key that may be used to decrypt and/or encrypt data. The authenticating device reader is configured to be coupled to the user's client machine, and includes a secure local output device, such as a screen or a speaker. The authenticating device reader includes logic to read the key from the authenticating device and use the key to encrypt/decrypt data. The combination of the authenticating device and the authenticating device reader provides a trusted, secure environment accessible only by its user or other authorized human being. The trusted, secure environment allows the transaction provider to utilize a one-time secret that is to be used to verify a transaction, and to remove the transaction verification phase, including the one-time secret, off of the untrusted client machine and onto the trusted, secure environment in order to provide a secure transaction.

For example, Catlin may want to transfer $500 from her checking account to her credit card to pay her monthly bill. To perform this account transfer, Catlin uses a web browser program executing on her laptop computer to visit her bank's website. Catlin then inserts a smart card (i.e., authenticating device) that she received from her bank into a smart card reader (i.e., authenticating device reader) that is coupled to her laptop computer to login to the bank's website. Having successfully logged in, Catlin accesses a transaction web page, sets up the desired account transfer, and clicks on a "transfer" button to request the transaction. In response, the bank creates a one-time secret for verifying the transaction, encrypts the one-time secret, and transmits the encrypted one-time secret to Catlin's laptop. The bank transmits the encrypted one-time secret as part of or with a verification request that includes details of the requested transaction (e.g. account transfer). Rather than being presented with a verification web page on the laptop computer's untrusted screen, the verification details, including the one-time secret, are only displayed on the screen of Catlin's smart card reader. This is because the key to decrypt the one-time secret is included in Catlin's smart card which is inserted into the smart card reader. Catlin then visually inspects the details of the transaction, and if the details of the transaction are correct, Catlin hits an "accept" button on her smart card reader to accept—i.e., verify, authenticate or authorize—the transaction. In response, the smart card transmits the one-time secret to the bank's website though the coupled laptop computer. If Catlin's smart card reader did not have input buttons (e.g., the "accept" button), Catlin could enter the one-time secret into a field in a verification web page displayed on her laptop computer, and click a "send" button to send the one-time secret to the bank's website. For example, the bank's website may display a verification web page, which includes details of the requested transaction, but not the one-time secret, as part of the verification request. In response to receiving the one-time secret, the bank's website performs—i.e., commits—the account transfer, and transmits an encrypted transaction receipt to Catlin's laptop computer. The received transaction receipt is displayed on the smart card reader's screen.

In some embodiments, the authenticating device reader and the untrusted client system or machine may be physically coupled. For example, the authenticating device reader may be provided on or as part of the untrusted client system such as a cell phone, mobile device, etc.

FIG. 1 is a high-level block diagram showing an environment in which the secure online transactions may operate. As depicted, the environment comprises a user 102, an authenticating device 104, an authenticating device reader 106 coupled to a client computing system 108, which is coupled to a server computing system 110 via a network 112. In particular, the authenticating device and the authenticating device reader enable interaction between the user, the user's computing system, and the server computing system via the network to facilitate a secure online transaction. Only one user, client computing system, and server computing system are shown in FIG. 1 for simplicity and one skilled in the art will appreciate that there may be a different number of users, client computing systems, and/or server computing systems. As used herein, the terms "connected," "coupled," or any variant thereof, means any connection or coupling, either direct or indirect, between two or more elements; the coupling of the connection between the elements can be physical, logical, or a combination thereof.

The user is any human user that wants to transact with a transaction provider, such as a bank. The authenticating device (e.g., a smart card) may be issued to the user by the transaction provider or an authorized third party. In some embodiments, the authenticating device is configured with a "smart chip" that allows a unique cryptographic key (e.g., a public key, a private key, etc.) to be stored by the authenticating device. The cryptographic key is known by the transaction provider, and may be used to encrypt/decrypt data. The transaction provider uniquely assigns the authenticating device to the user and, thus, the authenticating device facilitates authentication of the user.

The authenticating device reader is configured to be coupled to a computing system, such as the client computing system, and receive/send data over the coupling, and is also configured to read data from the authenticating device. In some embodiments, the authenticating device reader comprises a crypto logic chip (CLC), a local, trusted output, such as a screen and/or audio device, and an input/output (e.g., USB, wireless, serial, etc.) for connectivity, for example, to a computing system. The input/output allows the authenticating device reader to receive/send data from/to the coupled computing system via the input/output channel. The local, trusted output provides a "human user" output for delivering data for receipt by the human user. The CLC comprises Mandatory Access Control (MAC) logic to read the key contained in the authenticating device to encrypt/decrypt data and perform other operations on this data. For example, the authenticating device reader may receive encrypted data from a coupled client computing system, decrypt the encrypted data using a key contained in an authenticating device currently inserted in the authenticating device reader, and display the decrypted data on its local, trusted output. The authenticating device reader may store or maintain the encrypted and/or decrypted data in an optional secure buffer. In some embodiments, the authenticating device reader may also comprise an input device or multiple input devices, such as an "accept" button and a "deny" button, which may be used to provide human user input to the authenticating device. For example, in response to input from a user, the authenticating device reader may encrypt data, for example, in its secure buffer, and send the encrypted data to the coupled client computing system for transmission to another computing system.

In some embodiments, the authenticating device reader may be included as an integral component of the client computing system or other suitable computing system. For example, a laptop computer may include the authenticating device reader, and may provide a slot or other opening in which to insert an authenticating device. In these embodiments, the integrated authenticating device reader includes suitable logic and/or circuitry to secure the components of the authenticating device reader from the computing system's other components. Moreover, the authenticating device reader may include logic and/or circuitry to securely control the screen or display device of the computing system. This allows the integrated authenticating device reader to control the computing system's display device in order to securely display data on the display device. The authenticating device reader may also include logic and/or circuitry to provide an indication, such as a LED light, when the authenticating device reader has secure control of the computing system's display device.

The aforementioned aspects of the authenticating device and the authenticating device reader are only illustrative and are not intended to suggest any limitation as to the implementation of the illustrated components and/or the scope of use or functionality of either the authenticating device or the authenticating device reader. For example, in some embodiments, the authenticating device may include logic, keys, certificates, etc., as necessary to encrypt/decrypt authenticating information. Moreover, in some embodiments, the authenticating device reader may not include one or more of the illustrated components, or may include other components or logic in addition to those illustrated above.

In general terms, the client computing system includes a client application program that enables its user to access and transact with the server computing system. In operation, a user executes the client application on the client computing system and uses the client application to connect to and securely transact, by means of the trusted device, with a server application that is executing on the server computing system. For example, the client may be a web browser application or other interface application that is suitable for connecting to and communicating with the server application. In some embodiments, the client application may be included in a kiosk, ATM terminal, or other terminal device that is coupled to the server.

In general terms, the server computing system includes a server application or applications, including application servers, web servers, databases, and other necessary hardware and/or software components, to facilitate secure transactions on the server. For example, the server computing system is the transaction provider, and allows users to connect to the server application to perform one or more secure transactions.

The network is a communications link that facilitates the transfer of electronic content between, for example, the attached client computing system and server computing system. In one embodiment, the network includes the Internet. It will be appreciated that the network may be comprised of one or more other types of networks, such as a local area network, a wide area network, a wired network, a wireless network, a point-to-point dial-up connection, and the like.

The client computer system and the server computer system may include one or more central processing units, memory, input devices (e.g., keyboard and pointing devices), output devices (e.g., display devices), and storage devices (e.g., disk drives). The memory and storage devices are computer-readable media that may contain instructions that implement the server application, client application, and other components. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on. One of ordinary skill in the art will appreciate that the computer systems may be of various configurations having various components.

Embodiments of the described techniques may be implemented in various operating environments that include personal computers, server computers, computing devices, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, kiosks, ATMs, and so on.

The techniques for providing secure transactions may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

In the discussion that follows, various embodiments of the techniques for conducting secure transactions will be further described as pertaining to a banking transaction. It will be appreciated that many applications of the described techniques could be formulated and that the embodiments of the techniques for conducting secure transactions may be used in circumstances that diverge significantly from these examples in various respects. As such, the term "transaction" may refer to any transaction that may require verification of the transaction by the transaction requester. Examples of these transactions include, without limitation, financial transactions (e.g., banking, brokerage, insurance, bill payment, etc.), access or login to a company's network, modification of configuration information (e.g., network configuration, server configuration, firewall/router configuration, access control lists, etc.), electronic or online shopping, and access to or performance of any restricted service or operation.

Figures 2, 3:
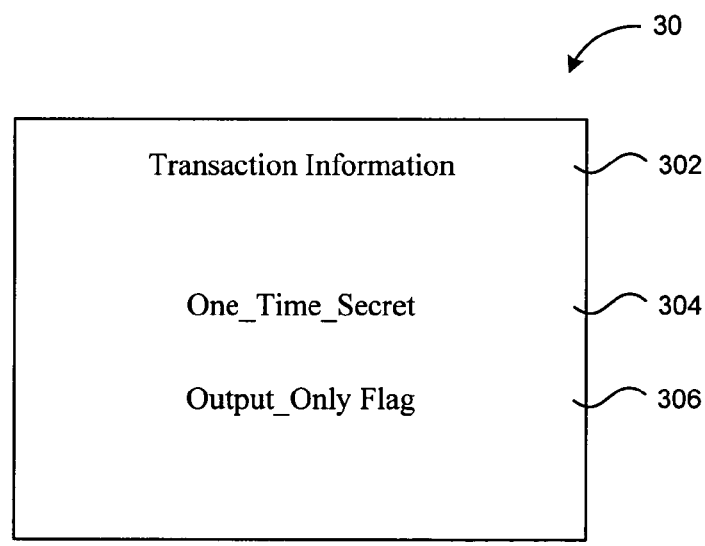
FIG. 2 is a block diagram that illustrates an example user table, according to some embodiments.
FIG. 3 is a block diagram that illustrates an example bundle of transaction data that is encrypted and sent by a transaction server to be decrypted by an authenticating device, according to some embodiments.

FIG. 2 is a block diagram that illustrates an example user table 20, according to some embodiments. The user table enables the transaction provider and, in particular, the transaction server to maintain a record of the authenticating devices that are distributed to its users (e.g., consumers, employees, etc.). By way of example, the user table is illustrated as comprising a plurality of records, each record comprising a user identification field 202, and a key field 204. The user identification field identifies a user. For example, the identification field may contain an identifier (e.g., login identification and password, account number and PIN, PIN, etc.) that uniquely identifies the user. The key field identifies an authenticating device. For example, the key field may contain an identifier (e.g., a serial number, identifier of the key included in the authenticating device, public key, etc.) that uniquely identifies the authenticating device. Thus, each record in the user table identifies an authenticating device and the rightful user of the authenticating device (i.e., the user that the authenticating device was distributed to).

FIG. 3 is a block diagram that illustrates an example bundle of transaction data 30 that is encrypted and sent by a transaction server to be decrypted by an authenticating device, according to some embodiments. The transaction server may generate the bundle of transaction data in response to receiving a transaction request, for example, from a client application, encrypt the transaction data and transmit the encrypted transaction data to the client application as part of a request for verification of the requested transaction. By way of example, the bundle of transaction data is illustrated as comprising a transaction information 302, a one_time_secret 304, and an output_only flag 306. The bundle of transaction data may also be referred to as a "blob" in that it is a collection (e.g., single entity) of binary data.

The transaction information specifies the details of the transaction. For example, for an account transfer banking transaction, the transaction information may indicate the specified amount of money to transfer, an account from which the money is to be transferred from, and an account to which the money is to be transferred to. In some embodiments, the transaction information is optional in that it need not be included in the transaction data. For example, the transaction information may be sent to the client application outside of the encrypted transaction data.

The one_time_secret is a challenge string, such as a character string, alpha-numeric string, numeric string, binary string, and the like, that is required for the transaction server to commit the transaction indicated by the transaction information. Stated another way, the transaction server needs to receive the one_time_secret from the user that requested the transaction in order to perform the transaction. The one_time_secret is tied to the transaction and is only valid for that transaction. The one_time_secret is presented to a user that requested the transaction on an authenticating device reader (i.e., the authenticating device reader that is coupled to the client computing system from which the transaction was requested), and the user enters may enter the one_time_secret on the client to verify (i.e., authorize) the transaction.

The output_only flag is a Boolean flag that indicates whether the contents of the transaction data and, in particular, the one_time_secret are to be made available outside of the trusted, secure environment (i.e., the authenticating device reader). For example, if the output_only flag is set (e.g., "true"), the authenticating device reader outputs the contents only on its local, trusted output device (e.g., screen, speaker, etc.) and does not provide the contents of the transaction data to insecure components such as the coupled client computing system. Conversely, if the output_only flag is not set (e.g., "false"), the authenticating device reader may provide the contents to insecure devices.

Figure 4:
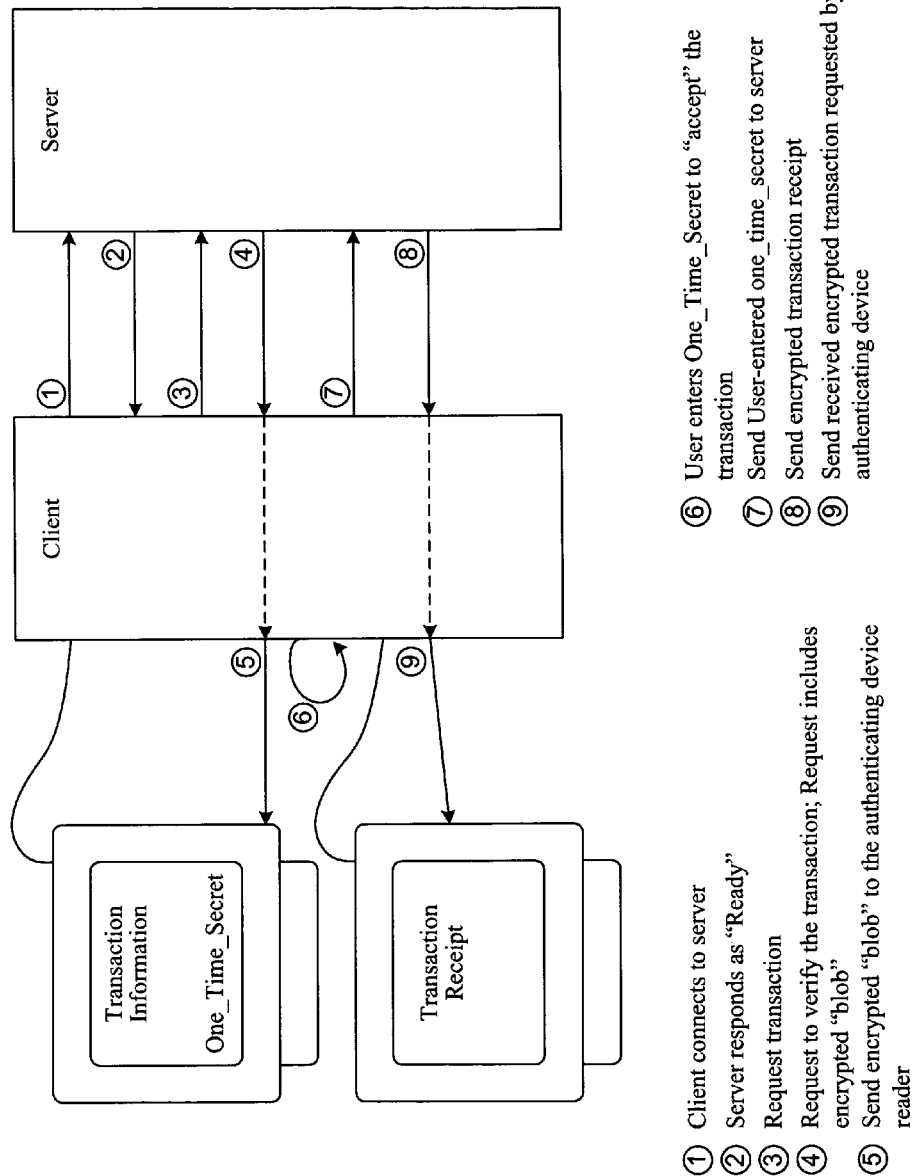
FIG. 4 is a diagram illustrating the interaction between a user, a client, an authenticating device reader, and a server to conduct a secure online transaction, according to some embodiments.

FIG. 4 is a diagram illustrating the interaction between a user, a client, an authenticating device reader, and a server to conduct a secure online transaction, according to some embodiments. By way of example, the user, who is a customer of a bank, may have previously received from the bank an authenticating device to use in performing online transactions with the bank's web server. Subsequently, the user, wanting to transfer $200 from the user's savings account to the user's checking account, inserts the user's authenticating device into an authenticating device reader coupled to the user's computing system. In stage 1, the user initiates the online banking transaction by invoking a client application, such as a web browser, on the user's computing system and navigating to the bank's website served, for example, by the bank's web server. Once at the bank's website, the user logs on to access the user's accounts and otherwise transact with the bank by providing authenticating information, such as login identification and a password or a PIN.

In stage 2, the bank's web server uses the received login information to authenticate the user. In response to authenticating the user (e.g., as a customer of the bank), the bank's web server may transmit to the user's web browser a web page through which the user can request various transactions. In stage 3, the user navigates to a suitable web page and requests to transfer $200 from the user's savings account to the user's checking account. For example, the user may enter the amount to transfer, the savings account number, and the checking account number into appropriate fields in the web page and click on a "transfer funds" button on the web page to request the specified transaction. In response, the web browser transmits the user's request to transfer the funds to the bank's web server. In stage 4, the bank's web server receives the transaction request (i.e., the request to transfer $200 from the user's savings account to the user's checking account), and generates a transaction verification request to send to the user for verification of the user's transaction by the user.

Figure 5:
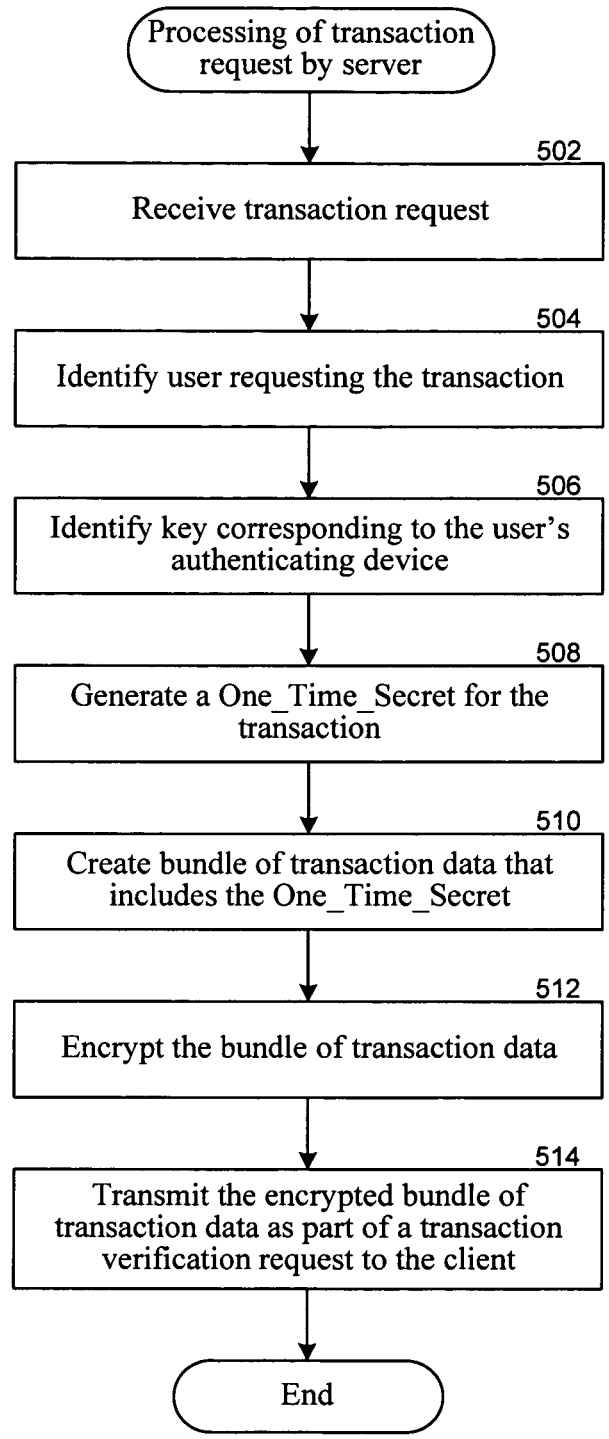
FIG. 5 is a flow diagram illustrating the processing of a transaction request by a server, according to some embodiments.

FIG. 5 is a flow diagram illustrating the processing of a transaction request by a server, according to some embodiments. In block 502, the server (e.g., the bank's web server) receives a transaction request (e.g., the request to transfer $200 from the user's savings account to the user's checking account). In block 504, the server identifies the user that is requesting the transaction. For example, server may identify the user from or using the information received or associated with the transaction request.

In block 506, the server identifies a key that corresponds to the user's authenticating device. For example, the server may identify the key from the data in the user table. In some embodiments, the key is a public key that corresponds to a private key (e.g., the public key and the private key are created using the same cryptographic algorithm) that is included in the authenticating device that was distributed to the user identified in block 504. In some embodiments, the key is a shared secret key or other cryptographic algorithm that is included in the authenticating device that was distributed to the user identified in block 504.

In block 508, the server generates a one_time_secret for the requested transaction. The one_time_secret is for use by the user requesting the transaction to verify the transaction as accurate. In block 510, the server creates a bundle of transaction data for the requested transaction. In some embodiments, the bundle comprises information regarding the requested transaction, the one_time_secret, and an output_only flag that is set to "true."

In block 512, the server encrypts the bundle of transaction data using the key identified in block 506. By encrypting the bundle of transaction data using this key, the server is assured that the encrypted bundle of transaction data can only be decrypted using the matching key. Stated another way, the encrypted bundle of transaction data can only be decrypted by the authenticating device reader using the key included in the requesting user's authenticating device.

In block 514, the server transmits the encrypted bundle of transaction data as part of a transaction verification request to the requesting client application (e.g., the client application used to request the transaction). The transaction verification request is a request for the user to verify or authorize the presented transaction (i.e., the transaction specified by the transaction information contained in the bundle of transaction data). In some embodiments, the transaction verification request instructs the client application executing on the user's computing system to send the encrypted data (i.e., the encrypted bundle of transaction data) to a specified address (i.e., the address of the coupled authenticating device reader). For example, the transaction verification request may be sent as a transaction verification web page that includes logic that instructs the web browser displaying the web page to send the encrypted data to the authenticating device reader.

Referring again to FIG. 4, in stage 5, the user's web browser processes the received transaction verification request. The transaction verification request may direct the web browser to forward the encrypted bundle of transaction data (i.e., the encrypted blob) contained in the transaction verification request to the coupled authenticating device reader. The web browser is unable to display the contents of the encrypted blob and, in particular, the one_time_secret on the client computing system's screen because the web browser does not have access to the key contained in the user's authenticating device. The web browser may display a web page that informs the user of the need to verify the transaction.

Figure 6:
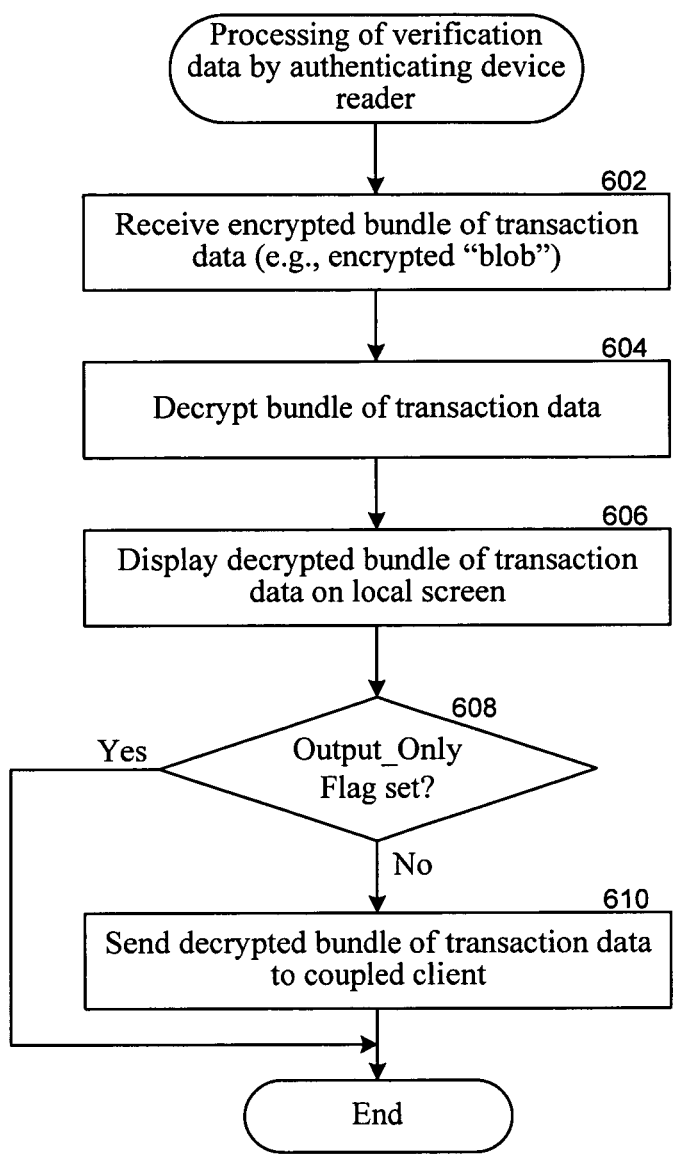
FIG. 6 is a flow diagram illustrating the processing of verification data by an authenticating device reader, according to some embodiments.

FIG. 6 is a flow diagram illustrating the processing of verification data by an authenticating device reader, according to some embodiments. The verification data is the encrypted data received from the coupled client computing system. In block 602, the authenticating device reader receives the encrypted bundle of transaction data. In block 504, the authenticating device reader uses the key contained in the inserted authenticating device (i.e., the user's authenticating device) to decrypt the encrypted bundle of transaction data. In block 506, the authenticating device reader displays the contents of the bundle of transaction data and, in particular, the one_time_secret on its screen, which is a trusted device. The authenticating device reader may not display the value of the output_only flag. In block 508, the authenticating device reader checks to determine whether the output_only flag is set. If the output_only flag is not set, the authenticating device reader, in block 510, sends the decrypted bundle of transaction data to the coupled client computing system. Otherwise, if the output_only flag is set, the authenticating device reader does not send or make available the decrypted bundle of transaction data to any untrusted device.

Referring again to FIG. 4, in stage 6, the user visually checks the information displayed on the authenticating device reader's screen to determine if it is the requested transaction (i.e., the request to transfer $200 from the user's savings account to the user's checking account). Assuming the displayed information is correct (i.e., the displayed information matches the requested transaction), the user enters the one_time_secret, for example, on a web page displayed on the user's computing system, to accept the transaction. By accepting the transaction, the user is authorizing the bank to commit (i.e., finish processing) the transfer of $200 from the user's savings account to the user's checking account.

In some embodiments, the authenticating device reader may output the decrypted bundle of transaction data via any local output; for example, a coupled audio device, such as a speaker. For example, the transaction data, including the one_time_secret may be played audibly such that the user can hear the transaction that the bank is requesting the user to verify. To accept the transaction, user can enter the one_time_secret on a web page displayed on the user's computing system.

In stage 7, the web browser sends the user-entered one_time_secret to the bank's web server. The one_time_secret may be entered using the user's computing system, which is an untrusted device, because the one_time_secret is valid only for authorizing the associated transaction. Moreover, because of this reason, the web browser may even transmit the one_time_secret, without encrypting the one_time_secret, over an untrusted network to the bank's web server.

Upon receiving the one_time_secret, the bank's web server checks to determine if the received one_time_secret matches the one_time_secret the web server generated for the user's request to transfer $200. Assuming that the received one_time_secret matches the secret generated for the requested transfer of $200, the web server transfers $200 from the user's savings account to the user's checking account. In stage 8, the bank's web server sends the transaction receipt for the requested transaction to the web browser. The receipt indicates that $200 was transferred from the user's savings account to the user's checking account. The receipt may also indicate the current balances of the two accounts as a result of the requested transaction. In some embodiments, the bank's web server may encrypt the transaction receipt using the key that corresponds to the user's authenticating device prior to sending the transaction receipt. By encrypting the transaction receipt using this key, the bank's web server is assured that the encrypted transaction receipt can only be decrypted using the matching key (i.e., the key contained in the user's authenticating device).

In stage 9, the web browser receives the transaction receipt and displays the transaction receipt on the user's computing system's screen. If the transaction receipt is encrypted, the web browser may forward the encrypted transaction receipt to the authenticating device reader coupled to the client computing device. Upon receiving the encrypted transaction receipt, the authenticating device reader uses the key contained in the inserted authenticating device (i.e., the user's authenticating device) to decrypt the encrypted transaction receipt and displays the transaction receipt on its screen.

One skilled in the art will appreciate that, for this and other processes and methods disclosed herein, the outlined steps are only exemplary, and some of the steps may be optional, combined with fewer steps, or expanded into additional steps without detracting from the essence of the invention. For example, in various embodiments, some or all of the data transmitted between the client and the server may be encrypted by the sender and decrypted by the receiver to provide added security. For example, the client and the server may exchange their public keys, and the sender may encrypt the data using the receiver's public key prior to transmitting the data. Moreover, some or all of the data transmitted between the client and the server may be signed by the sender.

Figure 7:
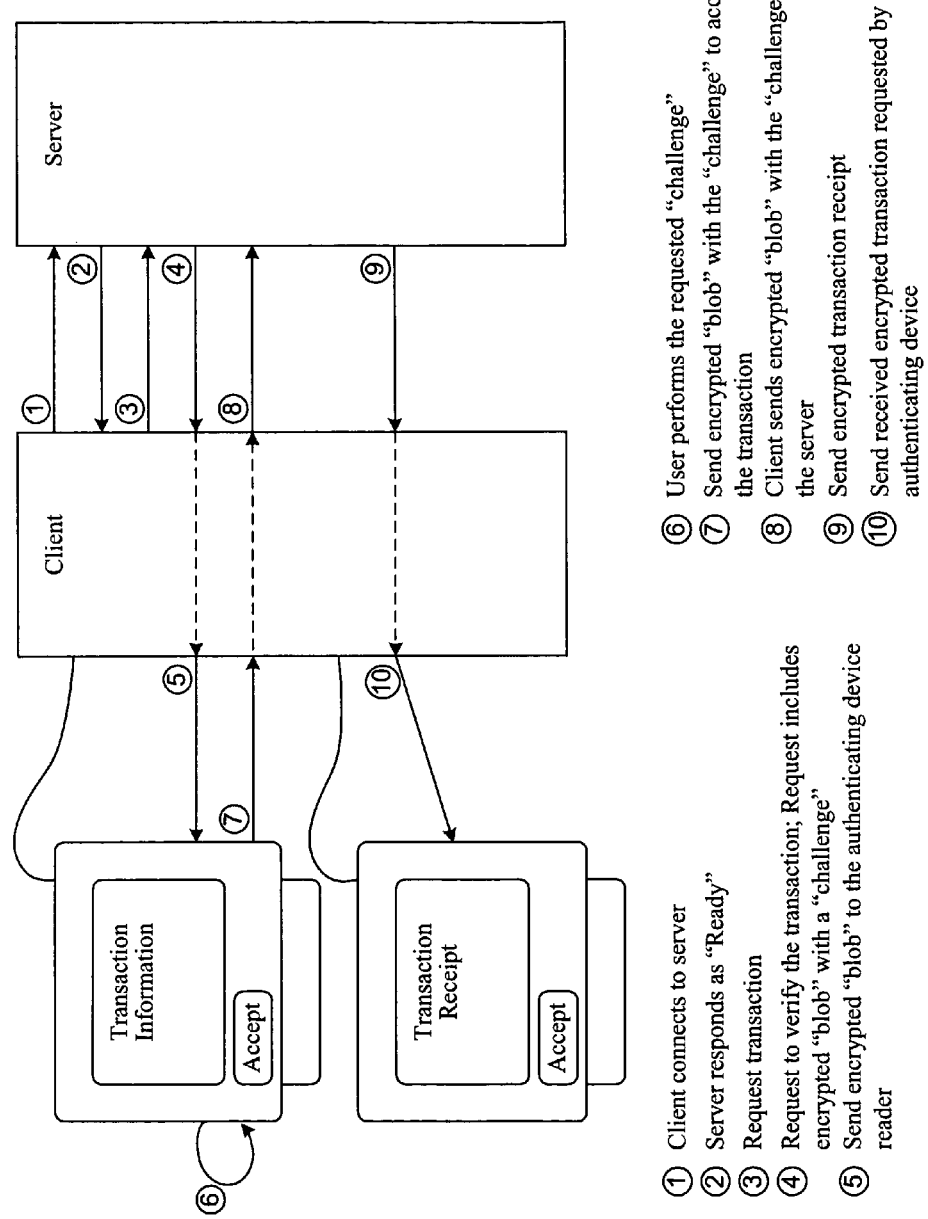
FIG. 7 is a diagram illustrating the interaction between a user, a client, an authenticating device reader, and a server to conduct a secure online transaction, according to some embodiments.

FIG. 7 is a diagram illustrating the interaction between a user, a client, an authenticating device reader, and a server to conduct a secure online transaction, according to some embodiments. In particular, the authenticating device reader comprises an input device for use by a user to perform the requested challenge (e.g., authorize a transaction displayed on the authenticating device reader's screen). Continuing the above account transfer example, stages 1-5 in FIG. 7 are identical to stages 1-5 in FIG. 4.

In stage 6, the user visually checks the information displayed on the authenticating device reader's screen to determine if it is the requested transaction (i.e., the request to transfer $200 from the user's savings account to the user's checking account). Assuming the displayed information is correct (i.e., the displayed information matches the requested transaction), the user accepts the requested challenge by hitting the "accept" input button provided on the authenticating device reader to accept the transaction. By accepting the transaction, the user is authorizing the bank to commit (i.e., finish processing) the transfer of $200 from the user's savings account to the user's checking account. In stage 7, the authenticating device reader encrypts the bundle of transaction data and sends the encrypted blob to the coupled client computing device to accept (i.e., authorize) the transfer of $200 between the accounts.

Figure 8:
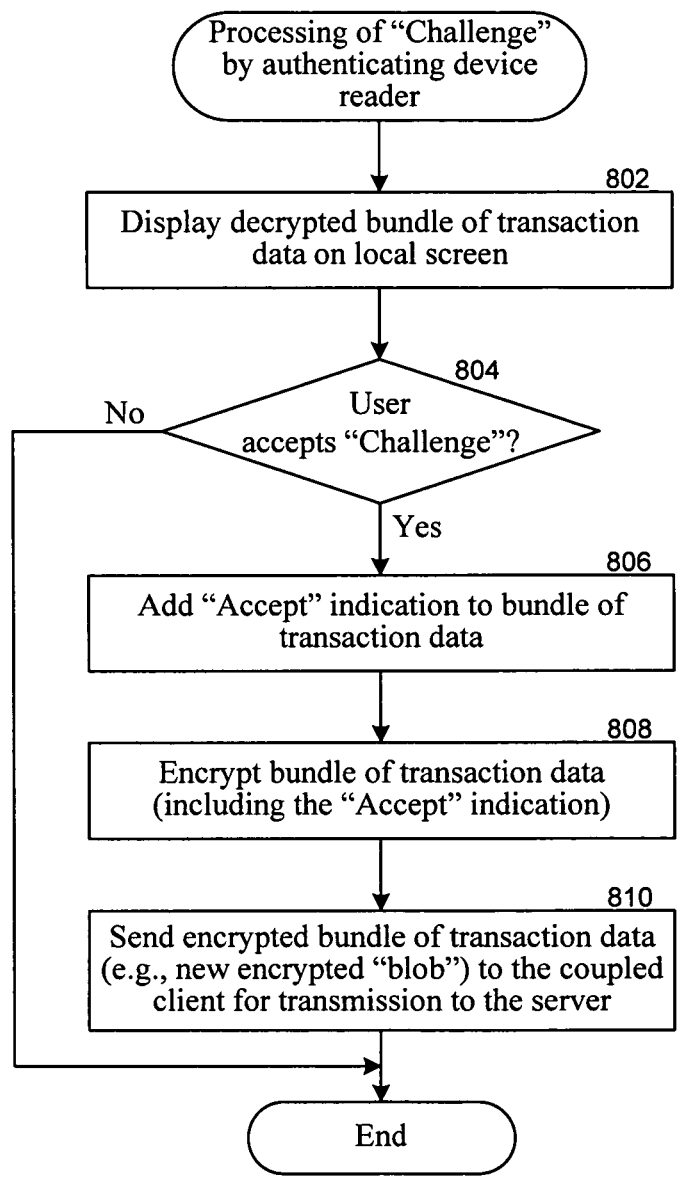
FIG. 8 is a flow diagram illustrating the processing of a challenge by an authenticating device reader, according to some embodiments.

FIG. 8 is a flow diagram illustrating the processing of a challenge by an authenticating device reader, according to some embodiments. In block 801, the authenticating device reader decrypts the received bundle of transaction data and displays the decrypted bundle of transaction data on its screen. In block 804, the authenticating device reader checks to determine whether the user accepts the challenge. For example, the user visually verifies the data displayed on the authenticating device reader's screen and, if the data accurately describes the transaction requested by the user, the user accepts the challenge by hitting the "accept" button provided on the authenticating device reader.

If the user accepts the challenge, then, in block 806, the authenticating device reader adds an accept indication to the bundle of transaction data. For example, the accept indication may be the one_time_secret that was generated by the server for this transaction and received as part of the transaction data sent by the server to the client and, ultimately, to the authenticating device reader. In block 808, the authenticating device reader uses the key contained in the inserted authenticating device (i.e., the user's authenticating device) to encrypt the bundle of transaction data. The encrypted bundle of transaction data includes the requested challenge and functions as an authorization for the server to commit the authorized transaction. In block 810, the authenticating device reader sends the encrypted bundle of transaction data to the coupled client computing system for transmission to the server.

Alternatively, if the user changes his or her mind about the transaction or the data displayed on the authenticating device reader's screen does not match or describe the requested transaction, the user may abort or refuse (i.e., not authorize) the transaction by hitting a "deny" button (not shown) provided on the authenticating device reader. If a "deny" button is not provided, the user may be able to abort or deny the transaction by providing a suitable input on the client application (e.g., web browser) executing on the user's computing system. In still other embodiments, the server or client may implement timers, and associate a timer to the transaction. If the user fails to perform the challenge before the timer expires, the client or the server may abort/cancel the transaction.

Referring again to FIG. 7, in stage 8, the web browser sends the encrypted blob (i.e., the encrypted bundle of transaction data) received from the authenticating device reader to the bank's web server. Stages 9 and 10 in FIG. 7 are identical to stages 8 and 9 in FIG. 4, respectively.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method for a first computing system to request a transaction on a second computing system, the first computing system having a processor and a memory, the first computing system operably coupled to an authenticating device reader, the second computing system trusting the authenticating device reader, but not trusting the first computing system, the method comprising:

receiving, by the first computing system, a request to perform a requested transaction on the second computing system, the received request input by a user of the first computing system;

transmitting, by the first computing system, the received request to the second computing system;

receiving, by the first computing system, from the second computing system a request to verify the requested transaction, wherein the request to verify the requested transaction comprises encrypted verification details and a one-time transaction-specific encrypted secret, the encrypted verification details and the one-time transaction-specific encrypted secret generated by the second computing system;

forwarding, by the first computing system, the received encrypted verification details and the received encrypted secret to the coupled authenticating device reader;

decrypting, by the authenticating device reader, the forwarded encrypted verification details and the forwarded encrypted secret using a key included in an authenticating device;

outputting, by the authenticating device reader, to an output device of the authenticating device reader the decrypted verification details;

outputting, by the authenticating device reader, the decrypted secret;

receiving, by the first computing system, the outputted decrypted secret that is output by the authenticating device reader, wherein the decrypted verification details are not provided to the first computing system; and transmitting, by the first computing system, the received decrypted secret to the second computing system for verification of the requested transaction so that the second computing system verifies the requested transaction.

2. The method of claim 1, wherein the output device of the authenticating device reader is a screen.

3. The method of claim 1, wherein the output device of the authenticating device reader is an audio device.

4. The method of claim 1 wherein the second computing system is provided by an online merchant.

5. The method of claim 1, wherein the transaction is an online transaction.

6. The method of claim 1, wherein the authenticating device is a smart card.

7. The method of claim 1, wherein the authenticating device is a secure token.

8. The method of claim 1, wherein the authenticating device uses biometrics.

9. The method of claim 1 wherein the decrypted secret is output to the output device and further comprising receiving from the user the decrypted secret.

10. The method of claim 1 wherein the decrypted secret is output to the first computing system and further comprising receiving from the authenticating card reader the decrypted secret.

11. A computer-readable storage medium that is not a propagating signal, storing computer-executable instructions that, when executed by a first computing system, cause the first computing system to request a transaction on a second computing system, the first computing system having a coupled authenticating device reader, the computer-instructions comprising instructions for:

receiving, by the first computing system, a request to perform a requested transaction on the second computing system, the received request input by a user of the first computing system;

transmitting, by the first computing system, the received request to the second computing system;

receiving, by the first computing system, from the second computing system a request to verify the requested transaction, wherein the request to verify the requested transaction comprises encrypted verification details and an encrypted secret, the encrypted verification details and the encrypted secret generated by the second computing system, the encrypted secret being a one-time transaction-specific secret;

forwarding, by the first computing system, the received encrypted verification details and the received encrypted secret to the coupled authenticating device reader for:
  decrypting, by the authenticating device reader using a key read from an authenticating device, the forwarded encrypted verification details and the forwarded encrypted secret; and
  outputting, by the authenticating device reader, the decrypted verification details to an output device of the authenticating device reader; and
  outputting, by the authenticating device reader, the decrypted secret;

receiving, by the first computing system, the decrypted secret; and transmitting, by the first computing system, the received decrypted secret to the second computing system for verification of the transaction so that the second computing system verifies the requested transaction.

12. A system to authenticate transactions, comprising:
a first computing device comprising:
  memory storing a component having computer-executable instructions that when executed by a processor of the first computing device causes the first computing device to perform:
    receiving, by the first computing device, from a user a request to perform a requested transaction on the second computing device;
    transmitting, by the first computing device, a transaction request to perform the requested transaction to the second computing device;
    receiving, by the first computing device from the second computing device, a transaction verification request comprising encrypted verification details and an encrypted secret that is one-time transaction specific;
    forwarding, by the first computing device, the received encrypted verification details and the received encrypted secret to an authenticating device reader that is coupled to the first computing device;
    receiving, by the first computing device, a decrypted form of the forwarded encrypted secret; and
    forwarding, by the first computing device, the received decrypted form of the forwarded encrypted secret to the second computing device so that the second computing device verifies the requested transaction; and
  the processor for executing the computer-executable instructions of the component stored in the memory; and
the authenticating device reader having a computer-readable medium storing instructions for controlling the authenticating device reader to perform:
  receiving, by the authenticating device reader, from the first computing device the forwarded encrypted verification details and the forwarded encrypted secret;
  decrypting, by the authenticating device reader, the forwarded encrypted verification details and the forwarded encrypted secret using a key of an authenticating device,
  outputting, by the authenticating device reader, the decrypted verification details to an output device coupled to the authenticating device reader; and
  outputting, by the authenticating device reader, the decrypted secret so that the first computing device can forward the decrypted secret to the second computing device wherein the second computing device verifies the requested transaction.

13. The system of claim 12, wherein the coupled authenticating device reader is integrated with the first computing device.

14. The system of claim 12, wherein the output device of the authenticating device reader is a display of the first computing device that the authenticating device reader can securely control.

15. The system of claim 12, wherein the key of the authenticating device is a certificate.

16. The system of claim 12 further comprising:
an input interface on the authenticating device reader, configured to cause the authenticating device reader to send the decrypted secret to the first computing device for forwarding to the second computing device.

17. The system of claim 12, wherein the authenticating device reader and the authenticating device jointly provide a trusted, secure environment.

18. The system of claim 12 wherein the authenticating device reader outputs the decrypted secret to the output device and the component further receives from the user the decrypted secret.

19. The system of claim 12 wherein the authenticating device reader outputs the decrypted secret directly to the first computing device.

20. The computer-readable storage medium of claim 11 wherein the authenticating device reader outputs the decrypted secret to the output device.

21. The computer-readable storage medium of claim 11 wherein the authenticating device reader outputs the decrypted secret directly to the first computing system.

* * * * *